Aug. 13, 1968  W. A. MICHALOWICZ  3,397,210
PROCESS FOR PREPARING MALEIMIDES USING A SOLID PHASE ACIDIC
ALUMINA-CONTAINING CATALYST
Filed Jan. 17, 1966
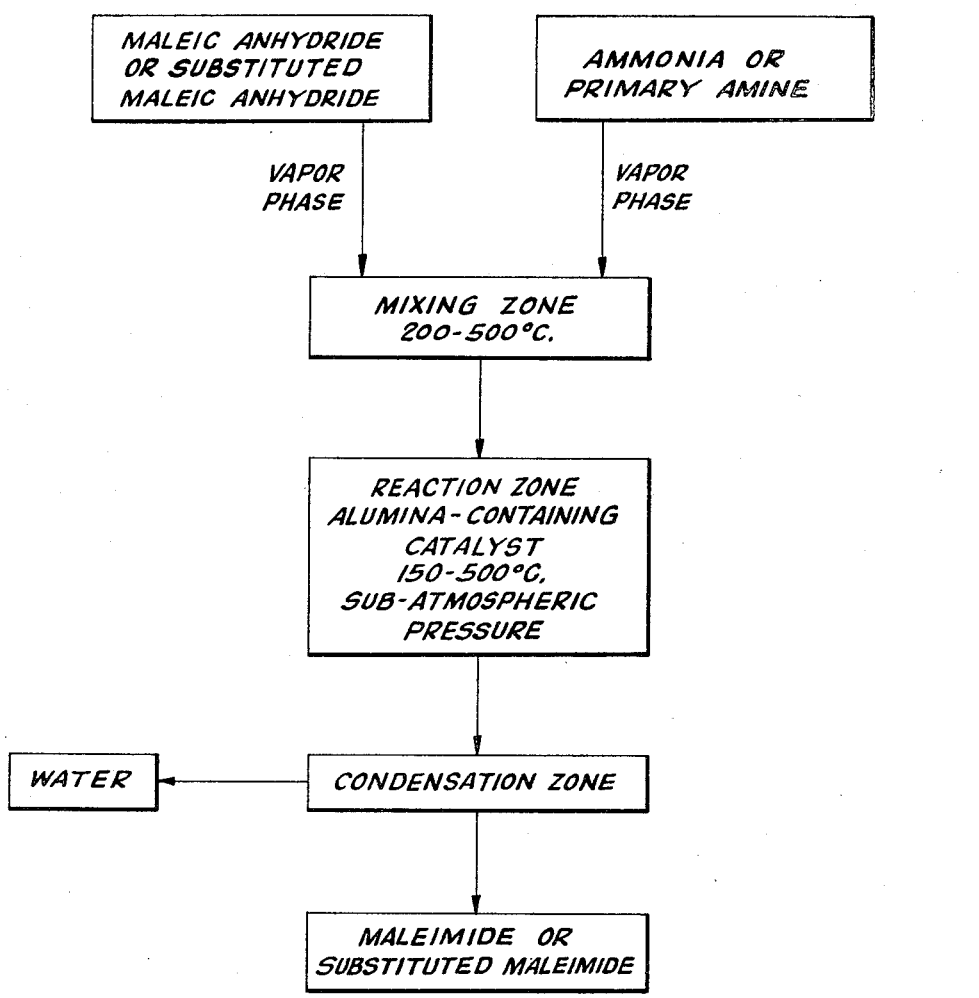
INVENTOR.
WILLIAM A. MICHALOWICZ
BY
his Agent

1

3,397,210
PROCESS FOR PREPARING MALEIMIDES USING A SOLID PHASE ACIDIC ALUMINA-CONTAINING CATALYST
William A. Michalowicz, Verona, Pa., assignor to Koppers Company, Inc., a corporation of Delaware
Filed Jan. 17, 1966, Ser. No. 521,069
8 Claims. (Cl. 260—326.5)

ABSTRACT OF THE DISCLOSURE

Maleimide or substituted maleimides are produced by reacting, in vapor phase, ammonia or a primary amine with a maleic anhydride in the presence of an acidic alumina containing catalyst.

---

This invention relates generally to a process for the preparation of maleimide and substituted maleimides and more specifically, to the preparation of maleimide or substituted maleimides by the reaction of primary amines or ammonia with maleic anhydride or substituted maleic anhydrides.

Robinson et al. Patent No. 2,459,964 describes a liquid phase reaction wherein gaseous ammonia is passed through a solution of maleic anhydride in an inert organic solvent such as xylene to produce maleamic acid. Robinson et al. stress that careful control of the temperature of the reaction is necessary because reaction at temperatures greater than 140° C. lead to resinification.

I have found that surprisingly, ammonia or a primary amine will react with maleic anhydrides or substituted maleic anhydrides when both are in vapor phase, at temperatures of 150–500° C. in the presence of an alumina-containing catalyst to produce maleimides or substituted maleimides of the formula

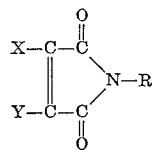

wherein X and Y are each from the class consisting of hydrogen, alkyl, aryl, alkaryl, and halogen and R is selected from the group consisting of hydrogen, alkyl, aryl and alkaryl.

According to my process, vapors of ammonia, or a primary amine (if an N-substituted maleimide is desired) are mixed with vapors of maleic anhydride or a substituted derivative thereof. The mixture of reactant vapors is passed over a solid phase heterogeneous alumina-containing catalyst at a temperature between 150° C. and 500° C. and a pressure below atmospheric pressure whereby maleimide, or a substituted maleimide, and water are formed. The maleimide is readily separated from the water. The reaction follows the sequence:

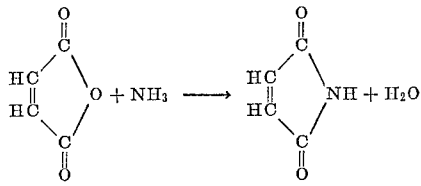

Catalysts suitable for carrying out the reaction are the solid phase heterogeneous alumina-containing catalysts. In general, the more acidic the alumina catalyst, the more effective the catalyst. Suitable catalysts include alumina pellets, silica-alumina, titania-alumina, tungsten-alumina.

In time, the catalyst will become contaminated with carbonaceous materials. The catalyst need only be calcined at a temperature of about 600° C. to burn off such contaminates and the catalyst activity will be restored.

Catalysts having no alumina were found not to give desired reaction products. Such catalysts as magnesium oxide, copper (mesh), and copper on zinc were ineffective, as was pyrolysis up to 550° C., in the absence of a catalyst over glass helices, stainless steel chips, carborundum and the like.

The choice of nitrogen containing compounds for my novel process varies widely. Ammonia is used in the preparation of maleimides unsubstituted on the nitrogen atom. For the preparation of N-substituted maleimides, primary amines are used. Useful primary amines include alkyl amines such as methylamine, ethylamine, isopropylamine, n-butylamine, and amylamine. Also useful are cycloalkyl amines such as cyclohexylamine; aryl amines such as aniline; o-, m-, and p-toluidine, o- and p-anisidine, and the like.

The variety of substituted maleic anhydrides useful in my process is also extensive. For example, halogen-substituted maleic anhydrides such as chloromaleic anhydride and bromomaleic anhydride may be used. Also useful are alkyl substituted maleic anhydrides and various other derivatives of maleic anhydride stable at the required reaction temperatures.

The reaction may be carried out at temperatures of from about 150–500° C., and the temperature may vary dependent upon the pressure being used. The temperature must be high enough to enable the maleic anhydride and nitrogen containing compounds to be reacted while in a vapor phase state. Also, if the temperature is too low, condensation of vapor to solid will occur, thus plugging the reactor and coating the catalyst, inhibiting the reaction. On the other hand, if the temperature is excessive, the catalyst will be weakened and decomposition of the products or reactants will occur. For convenience, I have found temperatures of between 150 and 350° C. to be best suitable, with temperatures in the area of 200° C. being preferred.

The pressure employed during the reaction will vary dependent upon the reactants being used, i.e., the higher the pressure, the higher the boiling point of the reactants, and the higher the temperature necessary for a vapor phase reaction. Pressures up to atmospheric may be employed but such pressures result in greatly decreased yields and I have found that the lower the pressure, the better the results. I prefer to use a pressure below 30 millimeters mercury.

As is known in the art, in determining the contact time in heterogeneous reactions the greater the time of contact of reactants with catalyst, the higher the probability that a reaction will occur. Once the reaction occurs, further contact with catalyst may promote secondary reactions which are undesirable. In the vapor phase reaction of this invention, this situation occurs. A study of the contact time in this invention indicated increasing conversion to maleimide with increasing contact time up to an optimum time after which decreasing conversion is obtained. The contact time was calculated from the formula:

$$\text{Contact time} = \frac{\text{Free space in catalyst bed (liters)}}{\frac{\text{Volume of reactant (liters)}}{\text{reaction time (seconds)}}}$$

Good conversions in the process of the invention result with contact times between 0.01 and 1.0 second, a preferred range being 0.04 and 0.1 second. The contact time was calculated based on the theoretical amount of maleimide produced which would pass over the catalyst.

The ratio of ammonia to maleic anhydride in the reaction should be about 1:1. Reaction ratios of ammonia to maleic anhydride of greater than one gave lower conversions and larger deposits on the catalyst. This may be attributable to the reaction of the ammonia with the electrophilic species in the reaction to form polymeric products. The use of less than stoichiometric amounts of ammonia also resulted in decreased conversion The use of a diluent in vapor phase reactions to lower the partial pressure of the reactants is known in the art. My process gives better yields at lower than atmospheric pressure. Surprisingly, however, in the present process, diluents proved to be of little or no value with respect to the yield of product.

The reaction product, maleimide or substituted maleimide, can be recovered by condensing the vapors in an ice bath or other cold trap at below about 50° C. while allowing the water produced to remain in vapor state to pass to a subsequent condensation apparatus or exhaust.

The product can then be processed by drying to remove any residual water and extracting with ether or other suitable solvent.

The process of my invention is schematically illustrated in the accompanying drawing by flow diagram.

My invention is further illustrated by the following examples:

Example I

To a 1¼ inch diameter Pyrex glass tube was added 400 milliliters of Houdry silica alumina catalyst in the form of ⅛ inch pellets (87 percent $SiO_2$—13 percent $Al_2O_3$, 70 percent free space). This constituted the reacting zone. To the bottom of the tube was fitted a collecting flask surrounded by an ice bath (ca. 5° C.) and a take-off for uncondensed vapors which was connected to a Dry Ice trap. The top of the glass tube was fitted with two valves for addition of reactants.

The temperature of the reacting zone was raised to 200° C., and the temperature of the mixing zone to 250° C. Molten maleic anhydride was fed to a preheater at a temperature of 250° C. and ammonia was fed to a preheater at a temperature of 300° C. The pressure on the whole system was lowered to one millimeter mercury. The vaporized maleic anhydride (0.33 mole) was fed to the mixer zone at a rate of 0.013 mole per minute and an equimolar quantity of ammonia was simultaneously introduced at a rate of 0.013 mole per minute. The vapors mixed in the mixing zone and the mixed reactant vapors then passed over the catalyst in the reactor zone at a contact time of 0.04 second. The temperature in the reactor zone varied from 206-212° C. during the 25 minute reaction time. The initial reactor temperature was 192° C. but rose to the indicated range by virtue of the exothermic reaction. After the addition of the reactants was complete, nitrogen was passed into the reactor system to restore the reactor to atmospheric pressure.

A white solid product (24.0 grams) was collected in the collection flask maintained in the ice bath. Water of reaction had passed through the ice bath into the Dry Ice trap. The product in the collector flask was vacuum dried at one millimeter mercury at 60° C. and the residue after drying was extracted from the flask with ether (four times with 150 milliliters). The ether insoluble portion (2.5 grams) was found to be maleamic acid (6.5 percent based on maleic anhydride). Evaporation of the ether extract followed by vacuum drying of the residue gave 20.6 grams of maleimide as a white solid melting at 84-86° C. The product analyzed free of maleic anhydride by infrared analysis. The yield of maleimide based on maleic anhydride was 64 percent.

Example II

The reaction of Example I was repeated except the reaction zone was heated to an initial temperature of 180° C. and an equimolar amount of methylamine was substituted for the ammonia and was added at the rate of 0.013 mole per minute. A pink discoloration was observed to move along the catalyst bed. The temperature of the reactor zone during reaction ranged from 179-186° C. After a 25 minute operation, 28.9 grams crude white product was obtained which after drying and ether extraction as in Example I yielded 26.4 grams of N-methylmaleimide melting at 90-91° C. The 26.4 grams of N-methylmaleimide corresponded to a 72 percent conversion.

Example III

Chloromaleic anhydride (0.174 mole) was added to the reactor system described in Example I. The reactor contained 210 milliliters of silica-alumina catalyst (87 percent $SiO_2$—13 percent $Al_2O_3$, 70 percent free space). Ammonia in an equimolar amount was added. The chloromaleic anhydride was mixed with ammonia in the preheater and passed over the catalyst at 210° C. and one millimeter pressure during 15 minutes. The crude product was dried and extracted as in Example I. A 75 percent conversion to chloromaleimide was obtained. The chloromaleimide after crystallization from benzene had a melting point of 123-124° C.

Example IV

The procedure of Example I was repeated except that the mole ratio of ammonia to maleic anhydride was increased to 2.1:1. Maleic anhydride was added to the reactor at a rate of 0.013 mole per minute and ammonia simultaneously added at a rate of 0.028 mole per minute. After 25 minutes, the addition of reactants was ceased and the crude product was dried and extracted with ether. Evaporation of the ether solution gave only a 48 percent conversion of maleimide, melting point 84-85° C. Infrared analysis indicated no maleic anhydride present.

Example V

A series of experiments were made to determine the effect of pressure upon the conversion of ammonia and maleic anhydride to maleimide. The procedure of Example I was followed except that pressures of 5 millimeters, 20 millimeters, and 30 millimeters were used. The results of the tests are shown in Table I, being compared with Example I (one millimeter).

TABLE I

| Pressure (mm. Hg) | Percent conversion |
| --- | --- |
| 1 | 64 |
| 5 | 59 |
| 20 | 53 |
| 30 | 36 |

As can be seen from the data, the conversion drops markedly when the pressure is increased much above 20 millimeters mercury, although maleimide is produced at higher pressures.

Example VI

The process of Example I was repeated except that an initial temperature in both the mixing and reacting zones was 150° C. On reaction of ammonia and maleic anhydride, the reacting zone temperature increased to ca. 165° C. and was maintained at this temperature. Solids were present in the reactor throughout the experiment. The conversion to maleimide fell to 30 percent showing the marked influence of the temperature on the process.

Example VII

The effect of contact time on the production of maleimide from ammonia and maleic anhydride was determined by following the procedure of Example I, except that the contact time was varied. The results follow:

| Contact time (sec.) | Percent conversion |
| --- | --- |
| 0.08 | 65 |
| 0.04 | 64 |
| 0.01 | 48 |
| 0.15 | 55 |

The above resuts show that best conversion is obtained if the contact time corresponds to about 0.04–0.1, and decreases when the contact time is outside this range.

I claim:

1. A process for preparing a maleimide of the formula:

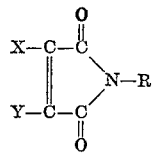

wherein X and Y each are from the class consisting of hydrogen, alkyl, aryl, alkaryl and halogen, and R is selected from the group consisting of hydrogen, alkyl, aryl, and alkaryl, comprising:

contacting a mixture of vapors of a reactant selected from the group consisting of maleic anhydride and substituted derivatives thereof and vapors of a nitrogen containing reactant selected from the group consisting of ammonia and primary amines, with a solid phase acidic alumina-containing catalyst for a period of between 0.01 and 1.0 second at a temperature of 150–500° C. and sub-atmospheric pressure to produce said maleimide, the reactants being present in about an equimolar ratio.

2. A process of claim 1 wherein said subatmospheric pressure is below 30 millimeters mercury.

3. A process of claim 1 wherein said temperature is 180–250° C.

4. A process of claim 1 wherein said mixture of vapors is comprised of maleic anhydride and ammonia.

5. A process of claim 1 wherein said mixture is comprised of maleic anhydride and aniline.

6. A process of claim 1 wherein said mixture is comprised of chloromaleic anhydride and ammonia.

7. A process of claim 1 wherein said mixture is comprised of maleic anhydride and methylamine.

8. A process for preparing a maleimide of the formula:

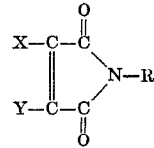

wherein X and Y each are from the class consisting of hydrogen, alkyl, aryl, alkaryl and halogen, and R is selected from the group consisting of hydrogen, alkyl, aryl, and alkaryl, comprising:

mixing vapors of a reactant selected from the group consisting of maleic anhydride and substituted rerivatives thereof and vapors of a nitrogen containing reactant selected from the group consisting of ammonia and primary amines to form a mixture thereof, and contacting said mixture at a sub-atmospheric pressure and a temperature of 150–500° C. with a solid phase acidic alumina-containing catalyst for a sufficient period of time to produce said maleimide.

No references cited.

NICHOLAS S. RIZZO, *Primary Examiner.*

JOSE TOVAR, *Assistant Examiner.*